United States Patent
Chung et al.

(10) Patent No.: US 11,287,869 B2
(45) Date of Patent: Mar. 29, 2022

(54) SYSTEM AND METHODS FOR ON-CHIP MEMORY (OCM) PORT THROTTLING FOR MACHINE LEARNING OPERATIONS

(71) Applicant: Marvell Asia Pte, LTD., Singapore (SG)

(72) Inventors: Heeloo Chung, San Francisco, CA (US); Sowmya Hotha, Saratoga, CA (US); Saurabh Shrivastava, Santa Clara, CA (US); Chia-Hsin Chen, Santa Clara, CA (US)

(73) Assignee: Marvell Asia Pte Ltd, Singapore (SG)

(*) Notice: Subject to any disclaimer, the term of this patent is extended or adjusted under 35 U.S.C. 154(b) by 83 days.

(21) Appl. No.: 16/864,006

(22) Filed: Apr. 30, 2020

(65) Prior Publication Data
US 2021/0341988 A1 Nov. 4, 2021

(51) Int. Cl.
| | |
|---|---|
| *G06F 1/00* | (2006.01) |
| *G06F 1/3234* | (2019.01) |
| *G06N 20/00* | (2019.01) |
| *G06F 3/06* | (2006.01) |
| *G06F 1/08* | (2006.01) |
| *G06F 1/3287* | (2019.01) |
| *G06F 1/3203* | (2019.01) |

(52) U.S. Cl.
CPC .............. *G06F 1/3275* (2013.01); *G06F 1/08* (2013.01); *G06F 1/3287* (2013.01); *G06F 3/0625* (2013.01); *G06F 3/0659* (2013.01); *G06F 3/0673* (2013.01); *G06N 20/00* (2019.01); *G06F 1/3203* (2013.01)

(58) Field of Classification Search
CPC ........ G06F 1/3275; G06F 1/08; G06F 1/3287; G06F 3/0625; G06F 3/0659; G06F 3/0673; G06N 20/00
USPC ........................................................ 713/322
See application file for complete search history.

(56) References Cited

U.S. PATENT DOCUMENTS

| | | | | |
|---|---|---|---|---|
| 9,792,397 | B1* | 10/2017 | Nagaraja | G06F 30/327 |
| 10,673,439 | B1* | 6/2020 | Ahmad | H03K 19/17748 |
| 2006/0075184 | A1* | 4/2006 | Chen | G06F 5/12 |
| | | | | 711/104 |
| 2015/0046677 | A1* | 2/2015 | Moloney | G06T 1/20 |
| | | | | 712/29 |
| 2018/0299921 | A1* | 10/2018 | Rajwani | G06F 9/30141 |
| 2019/0026237 | A1* | 1/2019 | Talpes | G06F 15/8007 |
| 2019/0243653 | A1* | 8/2019 | Sodani | G06F 9/3836 |
| 2019/0266479 | A1* | 8/2019 | Singh | G06F 17/16 |
| 2020/0287904 | A1* | 9/2020 | Asher | G06N 5/04 |

(Continued)

*Primary Examiner* — Volvick Derose

(57) ABSTRACT

A new approach contemplates systems and methods to support control of power consumption of a memory on a chip by throttling port access requests to the memory via a memory arbiter based on a one or more programmable parameters. The memory arbiter is configured to restrict the number of ports being used to access the memory at the same time to be less than the available ports of the memory, thereby enabling adaptive power control of the chip. Two port throttling schemes are enabled—strict port throttling, which throttles the number of ports granted for memory access to be no more than a user-configured maximum throttle port number, and leaky bucket port throttling, which throttles the number of ports granted for the memory access down to be within a range based on a number of credit tokens maintained in a credit register.

28 Claims, 5 Drawing Sheets

(56) References Cited

U.S. PATENT DOCUMENTS

2020/0410323 A1* 12/2020 Vinod ................... G06N 3/0454
2021/0103473 A1*  4/2021 Lin ........................... G06N 3/08
2021/0112011 A1*  4/2021 K S ......................... H04L 45/08

* cited by examiner

```
if (strict_thr_mode) begin
    if (req_num > throttle_port_num) begin
        if (throttle_port_num == 3'd5)
            final_grant_msk = rand_5;
        if (throttle_port_num == 3'd4)
            if (req_num == 6)
                final_grant_msk = rand_4;
            else if (req_num == 5) begin
                if (req_vec == rand_5)
                    final_grant_msk = (rand_5 <<1) & req_vec;
                else
                    final_grant_msk = rand_5 & req_vec;
            end
    else
        final_grant_msk = 6'h3f;
    end
end
```
// all req active
// all req active

FIG. 2A

```
pw_m1_thro_grant_msk = 6'b111111;      // for used for port_num=4
case (throttle_port_num)
  3'd0 : thro_grant_msk = 6'b000000;   // this is for test only, not recommanded value,
  3'd1 : thro_grant_msk = 6'b000001;   // only one port grant
  3'd2 : thro_grant_msk = 6'b001001;   // two port grant
  3'd3 : thro_grant_msk = 6'b010101;   // three port grant
  3'd4 : thro_grant_msk = 6'b010101;   // four port grant
  3'd5 : thro_grant_msk = 6'b110111;   // five port grant
  3'd6 ;
  3'd7 : thro_grant_msk = 6'b111111;   // six port grant
```

FIG. 3A

SYSTEM AND METHODS FOR ON-CHIP MEMORY (OCM) PORT THROTTLING FOR MACHINE LEARNING OPERATIONS

BACKGROUND

One of the big challenges of the system level design of a chip is to control its power consumption to be within a set of defined requirements. Since 70% area of the chip is occupied by on-chip-memory (OCM) that stores data to be accessed (read and/or write) by the processors/cores of the chip, the OCM is the component that consumes the most power on the chip as each memory operation (read/write) consumes a lot of power. The OCM power consumption issue is especially significant for a hardware-based machine learning (ML) system, which typically includes multiple cores/subsystems, each having its own OCM. Consequently, OCMs occupy most of the chip area of the hardware-based ML system and are the main source of power consumption of the chip.

Cache power optimization has been used for power management of the chip. However, most current power management schemes are proprietary and specific to the actual configuration of the chip. Some power management approach chooses to turn off power and access to certain memory banks/components on the chip when the memory banks are not in use. Such approach, however, restricts access to those memory banks, wherein such memory access is not always predictable in advance, causing performance degradation of the chip.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A depicts an example of the pseudo code under the strict port throttling scheme.

FIG. 3A depicts an example of the pseudo code used to set the random port access grant mask depending on a user configured maximum throttle number ranging from 0 to 7.

DETAILED DESCRIPTION

Figure 1:
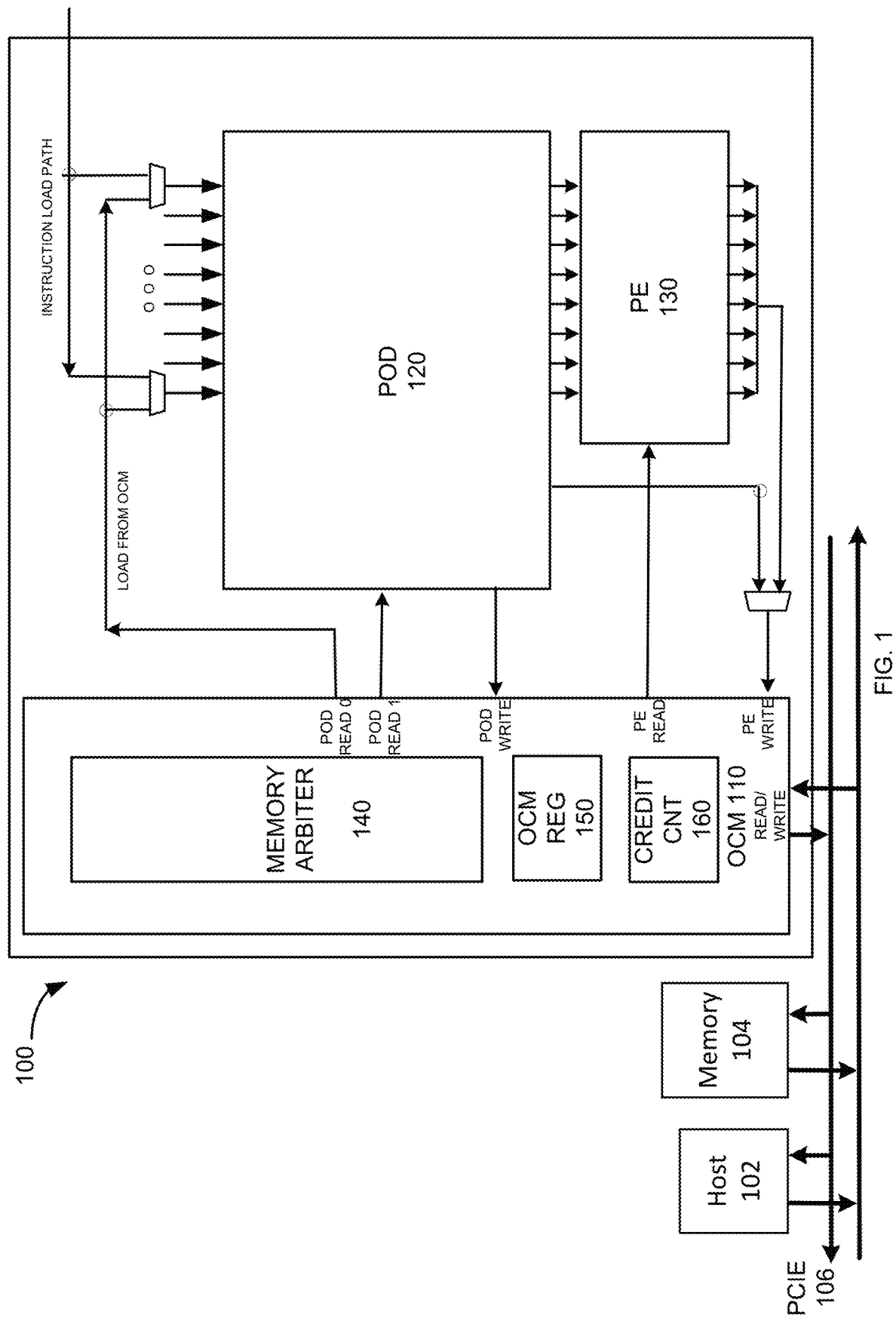
FIG. 1 depicts an example of a diagram of a hardware-based programmable system/architecture configured to support memory access for machine learning according to one aspect of the present embodiments.

The following disclosure provides different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach contemplates systems and methods to support control of power consumption of a memory unit, e.g., on-chip memory (OCM), of a chip by throttling port access requests to the memory via a memory arbiter based on a one or more programmable parameters. Here, the memory arbiter is configured to restrict the number of ports being used to access the memory at the same time to be less than the available ports of the memory, thereby enabling adaptive power control of the chip. In some embodiments, two port throttling schemes are enabled—strict port throttling, which throttles the number of ports granted for memory access to be no more than a user-configured maximum throttle port number, and leaky bucket port throttling, which throttles the number of ports granted for memory access down to be within a range based on a number of credit tokens maintained in a credit register.

The port throttling approach enables adaptive control of the power consumption by the OCM of the chip to be within a user-specified limit while still allowing uninterrupted access to the memory banks of the OCM for various memory operations during a certain period of time by temporarily suspending port throttling under certain circumstances. In addition, throttling ports of the OCM in the described manner further smooths out power consumption of the chip over time to cap and avoid peaks and/or valleys of power consumption during the same period of time. As such, the port throttling approach is able to manage access to the OCMs to control and reduce a large portion of power consumption of the chip while mitigating the impact of such port throttling on performance (e.g., OCM access time) of the chip.

Although OCM is used in the following discussions as a non-limiting example to illustrate the approach, it is appreciated that the embodiments can equally be applied to any types of memories. Furthermore, the embodiments can be generalized and extended to any resource access (e.g., memory, processing power, etc.) to control power consumption.

FIG. 1 depicts an example of a diagram of a hardware-based programmable system/architecture 100 configured to support power-efficient memory access for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the architecture 100 includes an OCM 110, a first type of processing unit (e.g., POD) 120, a second type of processing unit (e.g., processing engine or PE) 130, and a memory arbiter 140. Each of these components in the architecture 100 is a dedicated hardware block/component programmable by a user at a host 102 through a PCIe interface 106 via software instructions for various machine learning operations. When the software instructions are executed, each of the hardware components becomes a special purposed hardware component for practicing certain machine learning functions. In some embodiments, the architecture 100 is on a single chip, e.g., a system-on-chip (SOC).

In some embodiments, the OCM 110, which comprises one or more memory tiles/banks (not shown), is configured to accept and maintain data in a streaming fashion for access by the POD 120 and the PE 130 for various ML operations. In some embodiments, the POD 120 is configured to perform dense or regular computations on the data in the OCM 110, e.g., matrix operations such as matrix multiplication and manipulation, wherein input data are streamed to different sets of registers of the POD 120, respectively, and output data are streamed to the OCM 110 and/or the PE 130 through another set of registers of the POD 120. The PE 130 is configured to perform sparse/irregular computations and/or complex data shape transformations of the data in the OCM 110 and/or from the POD 120, e.g., memory transpose, quantization, addition operation, operations on irregular data structures (such as trees, graphs, and priority queues).

In the example of FIG. 1, the OCM 110 has a plurality of ports (or memory agents), wherein each port is individually accessible by the POD 120 and/or the PE 130 to access (read and/or write) data in the OCM 110 via a port access request. For non-limiting examples, as shown in FIG. 1, such ports to the OCM 110 include but are not limited to, Read and Write, which streams data from/to the OCM 110 from a memory 104, respectively; POD read 0 and POD read 1, which read data into different sets of registers of the POD 120, respectively; POD write, which writes data into the OCM 110 from a set of registers of the POD 120; PE read and PE write, which read and write data between the OCM 110 and the PE 130, respectively. All of these ports can accept the port access requests to independently and separately access to the data in the OCM 110 at the same time during the same clock cycle.

In some embodiments, the memory arbiter 140 is configured/programmed by the user via the host, wherein the host 102 enables a user to set/program one or more parameters as part of a memory (e.g., OCM) access policy dynamically at runtime. In some embodiments, the one or more parameters include a maximum number of ports allowed to request access to the OCM 110 at the same time, e.g., throttle_port_num, to limit power consumption of the OCM 110 to be within a budget. In some embodiments, the one or more parameters include an identification (e.g., a user-specified preferred port mask) of one or more ports that are preferred for OCM access and the port access requests to these ports should not be throttled. In some embodiments, the one or more parameters include a user-specified weighted vector setting priorities/weights on one or more ports for OCM access and the port access requests to the ports having lower priorities should be throttled first and the port access requests to the ports having higher priorities should be throttled last or should be avoided to be throttled unless absolutely necessary. In some embodiments, the one or more parameters include a user-specified cap on total power consumption by the port access requests to the OCM 110. In some embodiments, the memory arbiter 140 is configured to maintain the one or more parameters set by the host in an OCM register 150 of the OCM 110, wherein the one or more parameters stored in the OCM register 150 can be set and updated by the host to be higher or lower at runtime when the OCM 110 is being accessed by the POD 120 and/or the PE 130 via the port access requests.

In some embodiments, the memory arbiter 140 is configured to accept a plurality of memory access requests at the corresponding ports of the OCM 110 in the form of port access requests to the OCM 110. If there is no conflict (e.g., no read and write requests to the same memory bank at the same time), the memory arbiter 140 may grant all of these requests during the same clock cycle. If these port requests are all accessing different memory banks in the OCM 110 at the same time in a given clock cycle, however, granting all of these port requests might cost too much power and the power consumption caused by these port requests needs to be restricted.

In some embodiments, the memory arbiter 140 is configured to throttle one or more of the port access requests by granting only a subset of such requests to access the OCM 110 via the corresponding ports at the same time to limit power consumption of the OCM 110 based on the one or more parameters set in the OCM register 150. In some embodiments, the memory arbiter 140 is configured to adopt different port throttling schemes, including but not limited to, strict port throttling and leaky bucket port throttling based on the maximum number of ports allowed to request access to the OCM 110, throttle_port_num, as discussed in details below. In some embodiments, the memory arbiter 140 is configured to take into account the user-specified preferred port mask and/or the user-specified weighted vector during port throttling to avoid throttling the port access requests to certain ports to access the OCM 110.

Figure 2B:
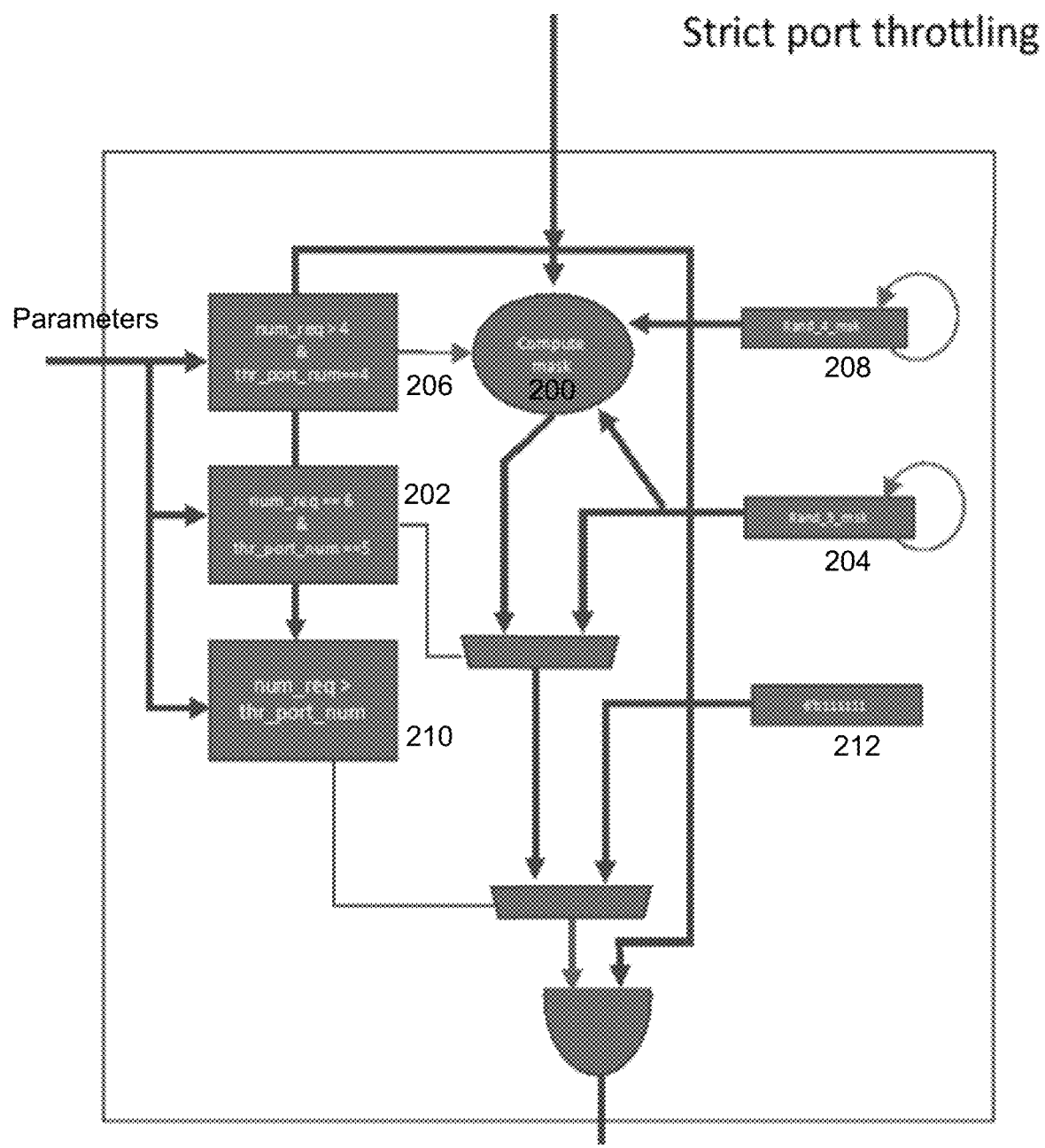
FIG. 2B depicts a non-limiting example of a diagram illustrating the strict port throttling scheme according to one aspect of the present embodiments.

In some embodiments, the memory arbiter 140 is configured to throttle the one or more ports allowed to access the OCM 110 via strict port throttling, wherein if number of port access requests received from all ports of the OCM 110 is greater than the throttle_port_num as set in the OCM register 150, the memory arbiter 140 is configured to only grant a number port access requests that is equal to the throttle_port_num. In some embodiments, the memory arbiter 140 is configured to suppress the rest of the port access requests based on random selection by computing a port access grant mask that covers all ports of the OCM 110 (representing one bit per port) accordingly (e.g., 1 means grant, 0 means suppress). FIG. 2A depicts a non-limiting example of the pseudo code under the strict port throttling scheme discussed above and FIG. 2B depicts a non-limiting example of a diagram illustrating the strict port throttling scheme. As shown in FIGS. 2A and 2B, when the throttle_port_num is set to five and there are six incoming port access requests (202), the memory arbiter 140 will compute a port access grant mask at 200 that only grants five of the port access requests and will randomly pick one of the six port access requests to suppress by using a random port access grant mask rand_5_mask (204) with one random port out of six suppressed. When the throttle_port_num is set to four (and there are more than four incoming port access requests) (206), the memory arbiter 140 will compute a port access grant mask at 200 that grants four of the port access requests and will randomly pick two of the six port access requests to suppress by using a random port access grant mask rand_4_mask (208) with two random ports out of six suppressed. If there are five incoming port access requests (while the throttle_port_num is set to four), the memory arbiter 140 will still compute a port access grant mask at 200 that grants exactly four of the port access requests and will randomly pick one of the five port access requests to suppress. In some embodiments, instead of using the random port access grant mask, the memory arbiter 140 is configured to utilize the user-specified preferred port mask and/or the user-specified weighted vector during port throttling to avoid throttling the port access requests to certain ports to access the OCM 110. In some embodiments, the memory arbiter 140 is configured to limit the number of port access requests to be throttled to be within a limit, e.g., no more than two, due to the time constraints (e.g., all port access requests will eventually be granted within a certain time period) and/or the complexity of possible permutations to select among the port access requests to suppress. For a non-limiting example, when the throttle_port_num is set to be less than four (and there are six incoming port access requests) (210), the memory arbiter 140 is configured to perform no port throttling to make sure that all port access requests are granted in a timely manner (212). In some embodiments, the memory arbiter 140 is configured to resume port throttling if the total power consumption by the port access requests exceeds the user-specified cap on total power consumption.

Figure 3B:
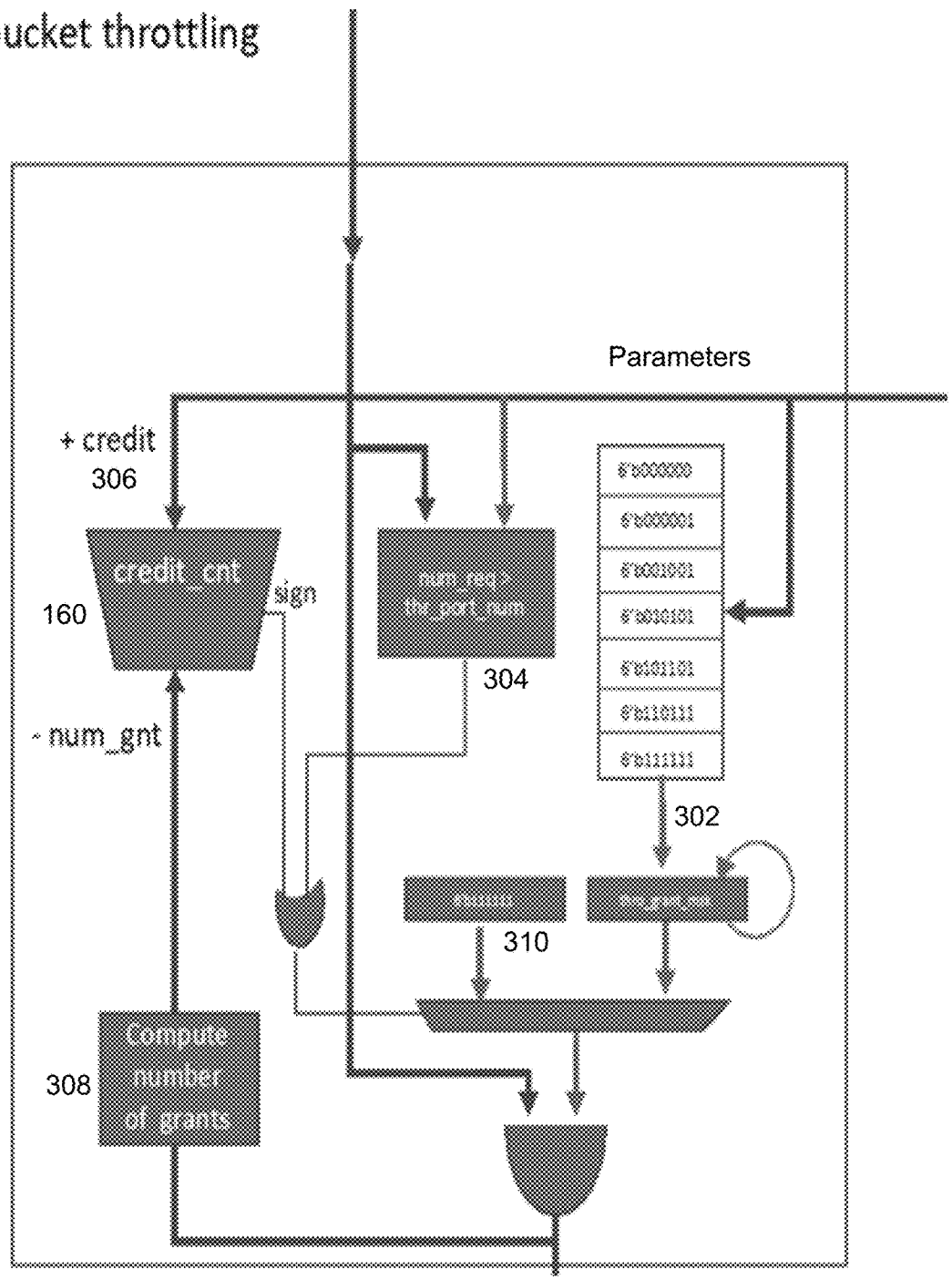
FIG. 3B depicts an example of a diagram illustrating the leaky bucket port throttling scheme according to one aspect of the present embodiments.

In some embodiments, the memory arbiter 140 is configured to throttle one or more ports allowed to access the OCM 110 via leaky bucket port throttling, wherein the memory arbiter 140 throttles the number of ports allowed for access to the OCM 110 down to be within a specific range, e.g., from 1 to 5. FIG. 3A depicts an example of the pseudo code used to set the random port access grant mask depending on the throttle_port_num ranging from 0 to 7, wherein the corresponding random port access grant mask would grant 0 to 6 port access requests accordingly. FIG. 3B depicts an example of a diagram illustrating the leaky bucket port throttling scheme. In some embodiments, the memory arbiter 140 is configured to establish a credit counter 160, which maintains a bucket of credit tokens when operating under the leaky bucket port throttling mode. In some embodiments, the credit counter 160 can become negative as a deficit counter. The memory arbiter 140 is then configured to create a random port access grant mask (302) based on the throttle_port_num set by the user. In some embodiments, instead of using the random port access grant mask, the memory arbiter 140 is configured to utilize the user-specified preferred port mask and/or the user-specified weighted vector during port throttling to avoid throttling the port access requests to certain ports to access the OCM 110.

In some embodiments, when the access requests come in from all ports of the OCM 110 at each clock cycle, the memory arbiter 140 is configured to first check the number of the port access requests against the specified throttle_port_num. As shown by FIG. 3B, if the total number of the port access requests is greater than the throttle_port_num (304), the memory arbiter 140 is configured to utilize the random port access grant mask to mask out requests received at some of the ports. However, since the port access grant mask was created randomly without awareness of a pattern of the port access requests, some of the port access requests can be overly-masked and overly-throttled, causing overly-constrained throttling of the port access requests. To compensate for this effect, the memory arbiter 140 is configured to adopt a leaky bucket credit scheme, which sets zero credit token in the credit counter 160 to start with and add additional credit tokens equal to the throttle_port_num to the credit counter 160 at each clock cycle (306). When a number of port access requests are granted, the memory arbiter 140 is configured to compute and subtract the number of granted port access requests from the credit tokens in the credit counter 160 (308). If the ports to the OCM 110 are overly-constrained, the credit tokens accumulated in the credit counter 160 becomes positive. When this happens (the credit counter 160 is positive), the memory arbiter 140 is configured to temporarily disable/suspend port throttling for one clock cycle, i.e., at the next clock cycle. During that next clock cycle, the memory arbiter 140 is configured to grant all port access requests irrespective of the throttle_port_num by setting all bits in the port access grant mask to 1s (310) and update the credit tokens in the credit counter 160 accordingly. As a result, more credit tokens may be consumed than what have been allocated, causing the credit counter 160 to become negative. In some embodiments, the memory arbiter 140 is configured to resume/re-enable port throttling if the total power consumption by the port access requests exceeds the user-specified cap on total power consumption. Once the number of credit tokens in the credit counter 160 becomes negative, the memory arbiter 140 is configured to re-enable port throttling by re-activating the port access grant mask again at the next cycle. Although the leaky bucket port throttling scheme may cause momentary high power usage, the average number of port access requests being granted per cycle will equal to the throttle_port_num over time, which smooths out power consumption by the OCM 110 to the limit on average. Note that the leaky bucket port throttling scheme only depends on the total number of port access requests granted and thus has no timing dependencies on the clock and does not require logic on which port access requests to grant or suppress.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based programmable system to support power-efficient memory access for machine learning (ML), comprising:
 an on-chip memory (OCM) comprising
  one or more memory tiles configured to accept and maintain data in a streaming fashion for access by one or more processing units for various ML operations;
  a plurality of ports, wherein each port of the plurality of ports is individually enabled to be accessible by the one or more processing units to read and/or write the data in the OCM via one port access request of a plurality of port access requests, wherein each port of the plurality of ports is configured to accept the port access request to access to the data in the OCM at the same time during the same clock cycle;
 a memory arbiter configured to
  accept the plurality of port access requests at the corresponding plurality of ports of the OCM;

throttle one or more port access requests of the plurality of port access requests by granting only a subset of such requests to access the OCM via the corresponding ports at the same time based on one or more parameters to limit power consumption of the OCM, wherein the throttle one or more port access requests restricts a number of ports being accessed at the same time to less than available number of ports to limit power consumption of the OCM.

2. The processing unit of claim 1, wherein:
the one or more processing units include a first processing unit configured to perform dense or regular computations on the data in the OCM.

3. The processing unit of claim 2, wherein:
the one or more processing units include a second processing unit configured to perform sparse/irregular computations and/or complex data shape transformations of the data in the OCM and/or from the first processing unit.

4. The processing unit of claim 1, wherein:
the memory arbiter is configured by a user via a host to set or program the one or more parameters as part of a memory access policy dynamically at runtime when the OCM is being accessed by the one or more processing units via the port access requests.

5. The processing unit of claim 1, wherein:
the one or more parameters include a maximum number of ports allowed to request access to the OCM at the same time in order to limit power consumption of the OCM to be within a budget.

6. The processing unit of claim 1, wherein:
the one or more parameters include a user-specified preferred port mask of one or more ports that are preferred for OCM access wherein the port access requests to these ports are not throttled.

7. The processing unit of claim 1, wherein:
the one or more parameters include a user-specified weighted vector setting priorities/weights on one or more ports for OCM access and the port access requests to the ports having lower priorities are throttled first and the port access requests to the ports having higher priorities are throttled last or are avoided to be throttled unless absolutely necessary.

8. The processing unit of claim 7, wherein:
the memory arbiter is configured to utilize a user-specified preferred port mask and/or the user-specified weighted vector to avoid throttling the port access requests to certain ports to access the OCM.

9. The processing unit of claim 1, wherein:
the one or more parameters include a user-specified cap on total power consumption by the port access requests to the OCM.

10. The processing unit of claim 1, wherein:
the memory arbiter is configured to throttle the one or more port access requests via strict port throttling, wherein if the number of the port access requests received from all ports of the OCM is greater than the configured maximum number of ports allowed to request access to the OCM at the same time, wherein only a number port access requests that is equal to the configured maximum number of ports are granted.

11. The processing unit of claim 10, wherein:
the memory arbiter is configured to suppress the rest of the port access requests based on random selection by setting a port access grant mask that covers all ports of the OCM representing one bit per port accordingly.

12. The processing unit of claim 10, wherein:
the memory arbiter is configured to limit the number of port access requests to be throttled due to the time constraints and/or the complexity of possible permutations to select among the port access requests to suppress.

13. The processing unit of claim 1, wherein:
the memory arbiter is configured to throttle the one or more port access requests via leaky bucket port throttling, wherein the memory arbiter is configured to throttle the number of port access requests allowed to access the OCM down to be within a specific range based on a credit counter maintaining a bucket of credit tokens.

14. The processing unit of claim 13, wherein:
the memory arbiter is configured to set zero credit token in the credit counter to start with and add additional credit tokens equal to the configured maximum number of ports allowed to request access to the OCM at the same time to the credit counter at each clock cycle.

15. The processing unit of claim 14, wherein:
the memory arbiter is configured to
subtract the number of granted port access requests from the credit tokens in the credit counter when a number of port access requests are granted;
temporarily disable port throttling for one clock cycle at the next clock cycle when the credit tokens accumulated in the credit counter becomes positive, wherein all port access requests are granted irrespective of the configured maximum number of ports allowed to request access to the OCM at the same time;
update the credit tokens in the credit counter accordingly.

16. The processing unit of claim 15, wherein:
the memory arbiter is configured to re-enable port throttling by re-activating a port access grant mask at the next cycle once the number of credit tokens in the credit counter becomes negative.

17. The processing unit of claim 15, wherein:
the memory arbiter is configured to re-enable port throttling if the total power consumption by the port access requests exceeds a user-specified cap on total power consumption.

18. A method to support power-efficient memory access for machine learning (ML), comprising:
accepting and maintaining data in an on-chip memory (OCM) for access by one or more processing units for various ML operations;
enabling a plurality of ports of the OCM, wherein each port of the plurality of ports is individually enabled to be accessible by the one or more processing units to read and/or write the data in the OCM via one port access request of a plurality of port access requests, wherein each port of the plurality of ports is configured to accept the port access requests to access to the data in the OCM at the same time during the same clock cycle;
accepting the plurality of port access requests at the corresponding plurality of ports of the OCM;
throttling one or more port access requests of the plurality of port access requests by granting only a subset of such requests to access the OCM via the corresponding ports at the same time based on one or more parameters to limit power consumption of the OCM,
wherein the throttle one or more port access requests restricts a number of ports being accessed at the same time to less than available number of ports to limit power consumption of the OCM.

19. The method of claim 18, further comprising:
enabling a user to configure and/or program a memory arbiter via a host, wherein the host sets the one or more parameters as part of a memory access policy dynamically at runtime when the OCM is being accessed by the one or more processing units via the port access requests.

20. The method of claim 18,
further comprising:
utilizing a user-specified preferred port mask and/or a user-specified weighted vector to avoid throttling the port access requests to certain ports to access the OCM.

21. The method of claim 18, further comprising:
throttling the one or more port access requests via strict port throttling, wherein if the number of the port access requests received from all ports of the OCM is greater than the configured maximum number of ports allowed to request access to the OCM at the same time, wherein only a number port access requests that is equal to the configured maximum number of ports are granted.

22. The method of claim 21, further comprising:
suppressing the rest of the port access requests based on random selection by setting a port access grant mask that covers all ports of the OCM representing one bit per port accordingly.

23. The method of claim 21, further comprising:
limiting the number of port access requests to be throttled due to the time constraints and/or the complexity of possible permutations to select among the port access requests to suppress.

24. The method of claim 18, further comprising:
throttling the one or more port access requests via leaky bucket port throttling, wherein the memory arbiter is configured to throttle the number of port access requests allowed to access the OCM down to be within a specific range based on a credit counter maintaining a bucket of credit tokens.

25. The method of claim 24, further comprising:
setting zero credit token in the credit counter to start with and add additional credit tokens equal to the configured maximum number of ports allowed to request access to the OCM at the same time to the credit counter at each clock cycle.

26. The method of claim 25, further comprising:
subtracting the number of granted port access requests from the credit tokens in the credit counter when a number of port access requests are granted;
temporarily disabling port throttling for one clock cycle at the next clock cycle when the credit tokens accumulated in the credit counter becomes positive, wherein all port access requests are granted irrespective of the configured maximum number of ports allowed to request access to the OCM at the same time;
update the credit tokens in the credit counter accordingly.

27. The method of claim 26, further comprising:
re-enabling port throttling by re-activating a port access grant mask at the next cycle once the number of credit tokens in the credit counter becomes negative.

28. The method of claim 26, further comprising:
re-enabling port throttling if the total power consumption by the port access requests exceeds a user-specified cap on total power consumption.

* * * * *